US006785036B1

United States Patent
Berneth et al.

(10) Patent No.: US 6,785,036 B1
(45) Date of Patent: Aug. 31, 2004

(54) ELECTROCHROMIC DISPLAY

(75) Inventors: Horst Berneth, Leverkusen (DE); Uwe Claussen, Leverkusen (DE); Ralf Neigl, Elmsford, NY (US); Wolfgang Jacobsen, Köln (DE)

(73) Assignee: Bayer Healthcare AG, Leverkusen (DE)

( * ) Notice: Subject to any disclaimer, the term of this patent is extended or adjusted under 35 U.S.C. 154(b) by 0 days.

(21) Appl. No.: 09/601,571

(22) PCT Filed: Jan. 22, 1999

(86) PCT No.: PCT/EP99/00411
§ 371 (c)(1),
(2), (4) Date: Sep. 1, 2000

(87) PCT Pub. No.: WO99/40481
PCT Pub. Date: Aug. 12, 1999

(30) Foreign Application Priority Data

Feb. 4, 1998 (DE) .......................... 198 04 314

(51) Int. Cl.[7] ............................................. G02F 1/155
(52) U.S. Cl. .................... 359/271; 359/268; 359/269; 359/270; 359/274
(58) Field of Search ............... 359/268, 269, 359/271, 273, 274, 267, 265, 266; 252/583; 204/290.07

(56) References Cited

U.S. PATENT DOCUMENTS

| | | | |
|---|---|---|---|
| 3,451,741 A | 6/1969 | Manos | 350/160 |
| 4,009,936 A * | 3/1977 | Kasai | 359/273 |
| 4,787,716 A * | 11/1988 | Kato et al. | 359/273 |
| 4,874,229 A | 10/1989 | Ito et al. | 350/357 |
| 4,902,108 A | 2/1990 | Byker | 350/357 |
| 5,446,577 A * | 8/1995 | Bennett et al. | 359/273 |
| 5,751,467 A * | 5/1998 | Byker | 359/272 |
| 5,818,625 A * | 10/1998 | Forgette et al. | 359/267 |
| 5,846,854 A * | 12/1998 | Giraud et al. | 438/149 |
| 5,940,202 A * | 8/1999 | Nishikitani et al. | 359/269 |
| 6,115,171 A * | 9/2000 | Minami et al. | 359/285 |
| 6,288,825 B1 * | 9/2001 | Byker et al. | 359/265 |
| 6,317,248 B1 * | 11/2001 | Agrawal et al. | 359/265 |
| 6,324,091 B1 * | 11/2001 | Gryko et al. | 365/151 |
| 6,404,532 B1 * | 6/2002 | Berneth et al. | 359/265 |

FOREIGN PATENT DOCUMENTS

| | | | |
|---|---|---|---|
| EP | 0240226 | 10/1987 | G02F/1/17 |
| EP | 0618477 | 5/1994 | G02F/1/155 |
| FR | 2689655 | 8/1993 | G02F/1/155 |
| WO | 9423333 | 10/1994 | G02F/1/15 |
| WO | 9730134 | 8/1997 | C09K/9/02 |
| WO | 9730135 | 8/1997 | C09K/9/02 |

OTHER PUBLICATIONS

Oran Brigham, FFT/Schnelle Fourier Transformation, R. Oldenbourg Verlag, Munchen/Wien., pp. 82–86 (1982).

* cited by examiner

Primary Examiner—David N. Spector

(57) ABSTRACT

The invention describes an electrochromic display element in the form of an electrically dimmable mirror, an optical filter having an electrically alterable transparency or a display element which contains an electrochromic liquid between two electrode sheets, where at least one of the electrode sheets is transparent and has a transparent, electrically conductive layer and the transparent electrode sheet has a pattern of strips or grid made of a material having metallic conductivity in order to produce a uniform coloration of the electrochromic liquid.

13 Claims, 2 Drawing Sheets

ELECTROCHROMIC DISPLAY

Figure 1:
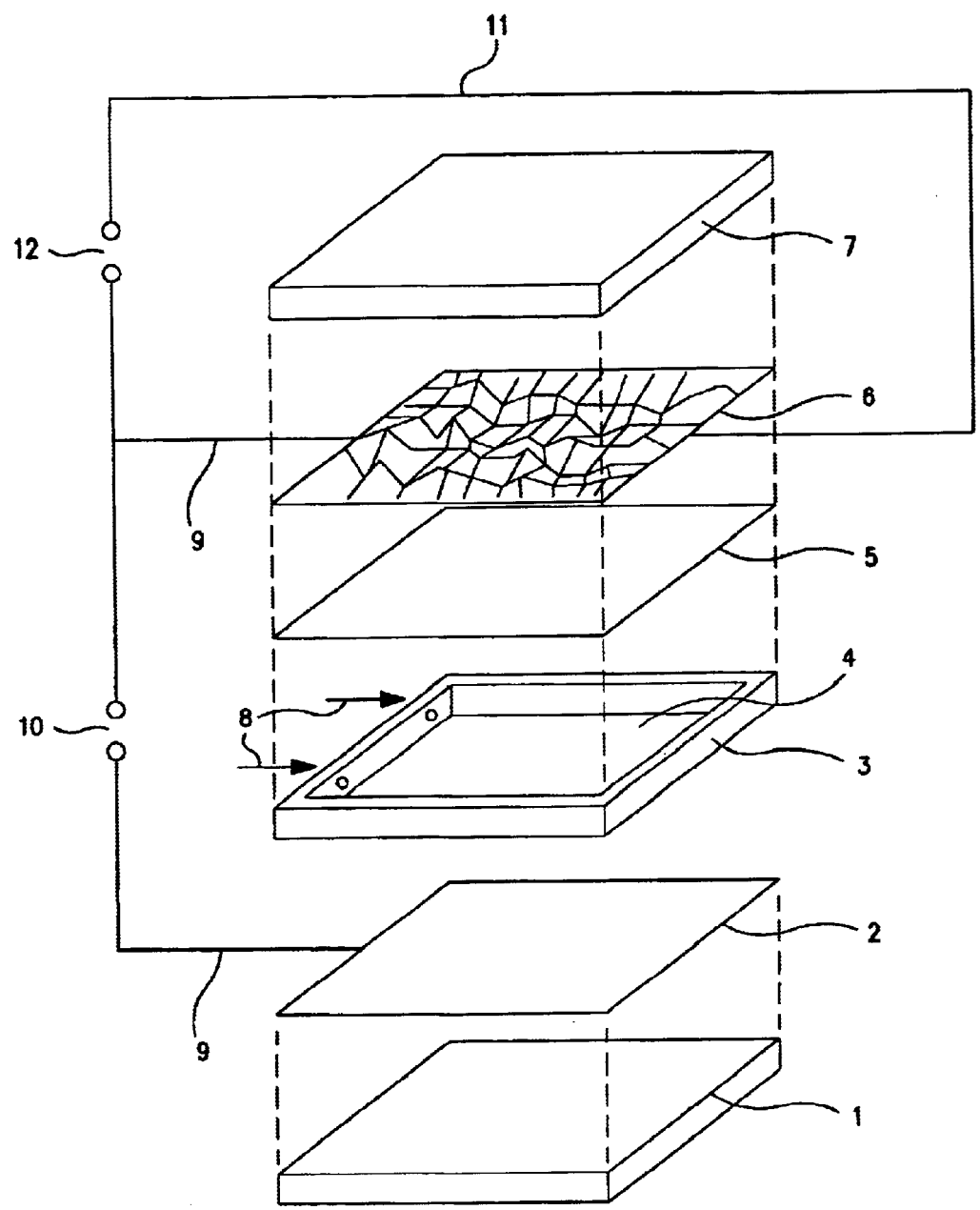

The present invention relates to electrooptical displays, particularly those having large switchable areas in the form of electrically switchable mirrors, windows or display elements.

In principle, electrooptical displays are constructed of two parallel capacitor plates which together with a sealing frame located between them define a flat chamber in which there is a medium which changes its optical anistropy, its absorption behaviour and/or its colour under the action of a voltage applied to the capacitor plates. At least one of the capacitor plates comprises a light-transparent material, for example glass or plastic (e.g. polycarbonate) which is provided on the side which is in contact with the electrochromic medium with an electrically conductive, light-transparent layer, in particular indium-tin oxide (ITO).

Such displays are known in principle from U.S. Pat. No. 3,451,741, EP-A 240 226 and WO 94/23 333.

In the case of large electrooptical switching areas in which the electrooptical medium additionally has a certain conductivity, particularly in the case of electrochromically switchable areas, irregularities in the coloration of the area occur. On the one hand, it is then often not possible to produce large areas having a uniform intensity of colour. On the other hand, on switching, the coloration spreads like a wave across the area. Such wave-like colour intensity fluctuations sometimes display the character of vibrations which occur even independently of the switching process if the power, as is customary, is supplied via the edge of the switching area.

These irregularities in the coloration have been able to be attributed to the comparatively high specific resistance of the transparent, conductive layers which is typically from 1 to 200 ohm per square.

It is known from FR 2 689 655, EP 618 477 and EP 294 756 that metal strips or metal grids can be applied to the counterelectrode of electrochromic cells based on electrochromic films. In the case of electrochromic cells based on liquid electrochromic media and having two equivalent electrodes, such a structuring of one or both electrodes has not previously been proposed since it was not clear a priori whether preferred current paths through the liquid medium would be formed so that, on application of a voltage, a more distinct coloration would occur in the region of the grid than between the grid lines.

The display cell of the invention contains an electrochromic medium which can be a liquid, a gel or a solid. Preference is given to liquids and gels. They contain one or more electrochromic substances, a solvent, one or more UV absorbers, if desired one or more conductance salts and, if desired, one or more thickeners.

Electrochromic substances which are suitable for the purposes of the invention are pairs of redox substances of which one is reducible and the other is oxidizable. Both are colourless or only slightly coloured. On application of a voltage to the display, one substance is reduced and the other is oxidized, with at least one becoming coloured. After switching off the voltage, the two original redox substances are formed again and the display decolorizes.

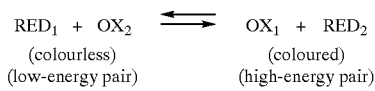

$RED_1 + OX_2$ ⇌ $OX_1 + RED_2$
(colourless) (coloured)
(low-energy pair) (high-energy pair)

It is known from U.S. Pat. No. 4,902,108 that suitable pairs of redox substances are those in which the reducible substance has at least two chemically reversible reduction waves in the cyclic voltammogram and the oxidizable substance correspondingly has at least two chemically reversible oxidation waves. Such substances are suitable for the purposes of the invention.

WO 97/30134 discloses redox systems in which $RED_1$ and $OX_2$ or $OX_1$ and $RED_2$ are covalently bound via a bridge B. Such substances are likewise suitable for the purposes of the invention.

Likewise suitable for the purposes of the invention are redox systems in which the reversible transition between RED and OX or vice versa is associated with the breaking or the formation of a σ bond. Such substances are known, for example, from WO 97/30135.

Also suitable for the purposes of the invention are metal salts or metal complexes of those metals which exist in at least two oxidation states. The two oxidation states advantageously differ by 1.

Likewise suitable for the purposes of the invention are oligomers and polymers which contain at least one of the redox systems mentioned or else pairs of such redox systems as are defined above.

Likewise suitable for the purposes of the invention are mixtures of the above-described substances, provided that these mixtures contain at least one reducible and at least one oxidizable redox system.

Suitable solvents, conductance salts, UV absorbers and thickeners are likewise known from the above-cited patent applications and can be utilized for the purposes of the invention.

According to the invention, it is now proposed that a pattern of strips or a grid made of a material having metallic conductivity be located above or below the transparent, electrically conductive layer of the display cell of the invention.

The pattern of strips or grid serves to even out local resistance fluctuations in the transparent, electrically conductive layer and to avoid voltage decreases in the layer. Surprisingly, this does not result in the formation of preferred current paths, but instead a uniform and rapid, uniform coloration of the switching area is produced.

The present invention accordingly provides an electrochromic display element which contains an electrochromic liquid between two electrode sheets, where at least one of the electrode sheets is transparent and has a transparent, electrically conductive layer, characterized in that the transparent electrode sheet or sheets has/have a pattern of strips or grid made of a material having metallic conductivity. Preferably less than 10%, particularly preferably less than 3%, of the display switching area is covered by the pattern of strips or grid having metallic conductivity.

The width of the strips and their spacing is advantageously determined as a function of the distance from which the display is viewed, as derived from the intended purpose of the display. The width of the metallic strips is advantageously selected such that the strips are not perceived by the viewer. If the display is configured as an electrically dimmable rear view mirror for motor vehicles, the strips preferably have a width of from 10 to 50 μm. Wider strips can be accepted if the display is configured as, for example, a display board in airports or the like where the viewing distance is large.

In the case of such large-area displays, it is also possible to employ regular grids in which the line spacing is greater than 3 mm.

Typically, the ratio of the width of the strips to the distance between the strips can be from 1/10 to 1/10,000, preferably from 1/10 to 1/1000, particularly preferably from 1/10 to 1/100.

The metal grid can be applied in various ways. It can be applied to the substrate by sputtering, vapour deposition including chemical vapour deposition (CVD) or by adhesive bonding of a finished grid. The metal itself should have a sufficient conductivity which should be greater than $10^4$/ohm.

This grid is coated with a layer of a metal oxide, with preference being given to transparent materials having good conductivity, e.g. $In_2O_3$ or $SnO_2$ or ITO or ZnO. These metal oxides can also be doped with traces of fluorides, antimony or aluminium to improve the conductivity.

The substrate has the function of supporting the conductive layer. In addition, it has to be transparent and serve as a barrier against chemical reactants of the electrochromic medium, in particular oxygen and water. Suitable substrates are glass or plastics, including in flexible form. The plastics in particular can be coated with layers which greatly reduce the permeation of the materials in question. This coating can be ITO of sufficient thickness or else comprise layers of non-conducting dielectrics such as $TiO_2$.

As an inexpensive alternative to coating the grid with a metallic oxide, it is also possible to use the reverse procedure, namely applying the metallic grid to a metallic oxide on at least one of the electrodes. This has the advantage that it is possible, in this case, to employ cheap substrates, e.g. glass/ITO or PET/ITO, without adversely affecting the homogeneity of the coloration.

If the metallic oxide layer is structured, i.e. made up of electrically separate parts, the contact grid naturally has to be structured in an analogous way.

Preferably, both electrode sheets are provided with a pattern of strips or grid of electrically conductive material. In this case, the pattern of strips on the two electrode sheets can also be arranged at right angles to one another. The grids on the two electrode sheets can also be arranged such that the grid lines of one grid run diagonal to the grid lines of the other grid. This configuration of the device of the invention makes it possible to achieve the favourable effect of rapid and uniform coloration of the switching area even in the case of display elements having two transparent electrode sheets which are operated in transmission.

A further significant improvement in the device of the invention is achieved by using a contact grid having a periodicity restricted to very short distances. The production of an aperiodic grid is in no way trivial. The arrangement according to the invention of the aperiodic contact grid can be described by a physical model, The starting configuration is a regular grid of dots having a dot spacing of a. Each dot in the grid is assigned a dot mass which is connected to each of its 4 nearest neighbours by means of a tensile spring. These springs are pretensioned to a certain degree, i.e. the rest length of the springs is less than the mean spacing between the dots of the grid.

The spring constants of the springs are assigned predetermined values randomly distributed about a mean. The energy minimum of the total system is then determined. The resulting positions of the dot masses form a grid having the sought-after properties:

The mean distance between two adjacent dots continues to be a. The grid is aperiodic. There is no preferred direction and the autocorrelation function decreases rapidly for values greater than a. The steepness of this decrease can be controlled by the scatter in the values of the spring constants. This means that the arrangement of the contact grid is determined taking the following criteria into account:

a) The shortest conductor strip connecting any 2 dots of the contact grid should have a mean length which is as short as possible in order to permit no large inhomogeneities in the conductivity of the surface.

b) The autocorrelation function of the contact grid has to drop very rapidly in all directions.

In order to be able to calculate the autocorrelation function of the grid, a function first has to be assigned to this grid. This can be done, for example, by assigning all points (x,y) lying on the lines of the contact grid the value 1 and all other points the value 0. For this function f(x,y), the autocorrelation function can then be determined in a known manner (see, for example, E. Oran Brigham, FFT/Schnelle Fourier-Transformation, R. Oldenbourg Verlag, Munich/Vienna 1982, p. 84 ff.):

$$Z(x, y) = \frac{\int_{-\infty}^{\infty}\int_{-\infty}^{\infty} f(x^*, y^*) \cdot f(x^* + x, y^* + y) dx^* dy^*}{\int_{-\infty}^{+\infty}(f(x^*, y^*))^2 dx^* dy^*}$$

In the case of a strictly periodic grid, e.g. a square grid having an edge length of a, the function $Z(x,y)$ has maxima of the same amplitude at all points where $x=n\cdot a$ or where $y=n\cdot a$ (n is an integer) independently of the value of n. As soon as this grid is deformed in such a way that the short-range order is maintained but the long-range order is not, the height of the maxima decreases rapidly with increasing n.

The arrangement of the contact grid optimized in this way according to the invention has the advantage that it is visually considerably less conspicuous than a periodic grid. As a result, the mean spacing of the grid lines can be made significantly greater and the production costs can be substantially reduced in this way. In particular, the greater mean spacing of the grid lines increases the light transmittance of the contact grid. When both electrodes are provided with an aperiodic contact grid according to the invention, the moire effect is suppressed. The moire effect appears as an interference phenomenon when two electrodes lying opposite one another have periodic structures. The moire effect causes, corresponding to the interference pattern, an inhomogeneous field distribution between the electrodes and correspondingly an inhomogeneous coloration in the electrochromic cell.

Three basic types of the electrochromic display of the invention can be distinguished:

Type 1: Full-area electrochromic display, for example for window panes.

Type 2: Electrically dimmable mirrored display, for example automobile mirrors.

Type 3: Electrochromic image display, for example segmented or matrix displays.

In the case of Type 1, use is made of glass or plastic plates which have all of one side coated with a transparent conductive layer. At least one of these layers is a layer according to the invention containing a metallic pattern of strips or grid. This gives a transmissive electrochromic device which can be viewed in transmitted light.

In the case of Type 2, plates as in Type 1 are used. In addition, one of the two plates is mirrored. This mirroring can be applied to the second side, which is not coated with conductive material, of one of the two plates. However, it can also be applied instead of the conductive coating mentioned to one of the two plates and thus simultaneously perform the function of conductive layer and mirroring. In this case, this second plate itself can be non-transparent, e.g. an opaque plastic, a metal plate or the like. For the mirroring, it is possible to use silver, chromium, aluminium, palladium or rhodium or other known conductive and reflective mixtures of these materials. This gives a reflective electrochromic device.

For Type 3, it is possible to select the construction form of Type 1 or Type 2, thus giving a transmissive or reflective electrochromic display. However, in either case, at least one of the two conductive layers or both is/are divided into electrically separate segments which are individually provided with contacts. It is also possible for only one of the two plates to have a conductive coating and be divided into segments. The segments can be separated, for example, by mechanical removal of the conductive layer, for example by scoring, scratching, scraping or milling or by chemical means, for example by etching by means of, for example, a hydrochloric acid solution of $FeCl_2$ and $SnCl_2$. This removal of the conductive layer can be controlled in terms of position by means of masks, e.g. masks of photoresist. Alternatively, the electrically separate segments can be produced by targeted, e.g. by means of masks, application, e.g. by sputtering or printing, of the conductive layer. The provision of the segments with contacts is carried out, for example, by means of fine strips of conductive material, each of which connects the segment electrically to a contact at the edge of the electrochromic device. These fine contact strips can either consist of the same material as the conductive layer itself and be produced, for example, when the layer is divided into segments as described above, or they can, for example to improve the conductivity, consist of another material such as fine metallic conductors, for example of copper or silver. A combination of metallic material and the material of the conductive coating is also possible. These metallic conductors can, for example, either be applied in fine wire form, e.g. adhesively bonded on, or be printed on. All these above-described techniques are generally known from the production of liquid crystal displays (LCDs).

In the case of the conductive coating according to the invention, it has to be ensured that in each of these segments and their electrical leads there is at least one continuous line of the material having metallic conductivity. This can be achieved, for example, by the mesh spacing of the pattern of strips or grid being smaller than the dimensions of the segments or leads. However, it can also be achieved by, for example, applying lines of the material having metallic conductivity to the glass or plastic plate, for example by sputtering, printing or etching from a continuous coating, which lines run completely through each of the planned segments and their leads. Here, at least one continuous line per segment and its lead can be sufficient. Subsequently, a conductive metal oxide layer can be applied, e.g. by sputtering, printing or coating, to the plates which have been prepared in this way. This metal oxide layer can be applied over the entire area. The segments and their leads then have to be separated from one another in the described manner, e.g. by etching. However, the metal oxide layer can also be applied directly in the form of the segments and their leads, e.g. by sputtering or printing with the aid of masks.

The displays can be viewed in transmitted light or reflectively by means of mirroring or transflectively by a mixture of these two effects.

Specific embodiments of the abovementioned Types 1 to 3 can, for example, be the following, which are likewise subject matter of the invention:

Type 1: from the application area of light protection/light filters: window panes for, for example, buildings, road vehicles, aircraft, rail vehicles, ships, skylights, sunroofs in automobiles, glazing of greenhouses and winter gardens, light filters of any type from the application area of security/privacy: separation panes for, for example, room partitions in, for example, offices, road vehicles, aircraft, rail vehicles, non-see-through panes on, for example, bank counters, door glazing, visors for, for example, motorcycle or pilot's helmets.

from the application area of design: glazing of cooking ovens, microwave appliances, other household appliances, furniture.

Type 2: mirrors of any type, e.g. rear-view mirrors for, for example, road vehicles, rail vehicles, in particular planar, spherical, aspherical mirrors and combinations thereof, e.g. spherical/aspherical, mirror glazing in furniture.

Type 3: display devices of any type, e.g. segmented or matrix displays, e.g. for clocks and watches, computers, electric appliances, electronic appliances such as radios, amplifiers, televisions, CD players, etc., destination displays in buses and trains, departure displays in railway stations and airports, flat VDUs, all applications which are mentioned under Type 1 and 2 Which contain at least one switchable, static or variable display device, e.g. separation panes which include displays such as "Please do not disturb", "Till not open", e.g. automobile mirrors which include information displays of any type, e.g. indications of temperature, faults in a vehicle (e.g. oil temperature, open doors), time, compass bearing, etc.

The invention is illustrated below with the aid of
FIG. 1 (attached):

FIG. 1 shows an exploded view of the in-principle structure of a display according to the invention in the form of an electrically switchable mirror. The mirror comprises a first glass plate 1 with metallic mirroring 2 and also a second glass plate 7 on which there is applied an aperiodic grid 6. The ITO layer 5 is applied on top of the aperiodic grid 6. Between the coated plates 1 and 7 there is a frame 3 which ensures the spacing of the plates and seals the chamber 4 for the electrochromic liquid. The electrochromic liquid can be introduced under reduced pressure via the orifices 8. A first voltage supply 10 is connected to the electrode layers 2 and 5, 6 via leads 9. Application of a voltage to the voltage supply 10 changes the reflection behaviour of the mirror. In the case of a motor vehicle mirror, the metallic grid 6 can additionally be used for heating. For this purpose, a second voltage source 12 which is connected to the grid 6 via leads 11 is provided.

Figure 2:
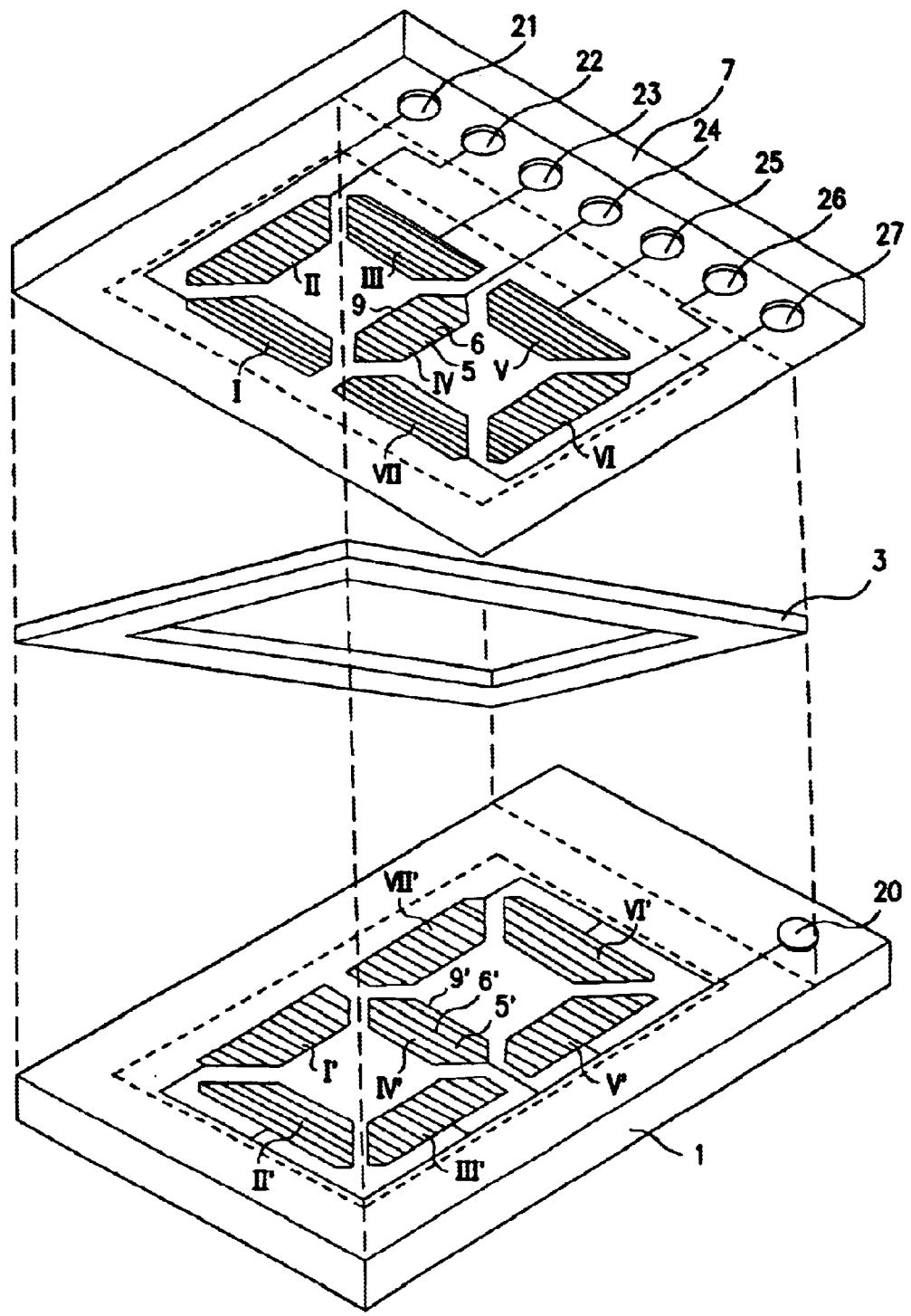

FIG. 2 shows a large-area segmented display element according to the invention for back-lighting, which is suitable, for example, for airport information boards. Like numerals indicate like elements as in FIG. 1.

Each segment I to VII has facing ITO layers 5 and 5', a pattern of strips 6 and 6' and a border 9 and 9' having metallic conductivity. The ITO layers and patterns of strips of one plate 7 can be controlled via contacts 21 to 27. The facing layers are earthed via contact 20.

What is claimed is:

1. An electrochromic display element which comprises:

1) a first electrode comprising:
  a first substrate, made of transparent material in the form of a sheet having a smooth flat surface;
  a first electrically conductive layer, located on said flat surface of said first substrate and being continuous and transparent; and
  a periodic or aperiodic pattern of strips or grid made of metallic conductive material located outside of said first substrate, and above or below said first electrically conductive layer and in continuous electrical contact with the same;

2) a second electrode comprising:
- a second substrate, made of material which is the same as or different from that of said first substrate, in the form of a sheet having a smooth flat surface;
- a second electrically conductive layer, located on said flat surface of said second substrate and being continuous and optionally transparent; and
- optionally, a periodic or aperiodic pattern of strips or grid made of metallic conductive material located outside of said second substrate, and above or below said second electrically conductive layer and in continuous electrical contact with it;

3) an electrochromic medium; and 4) means for maintaining the electrically conductive layers of said first and second electrodes in spaced-apart proximity facing each other, and for holding said electrochromic medium between said first and second electrodes.

2. The electrochromic display element according to claim 1, characterized in that the electrochromic medium is a solution, a gel or a solid.

3. The electrochromic display element according to claim 1 or 2, characterized in that the electrochromic medium contains at least one pair of redox substances of which one is reducible and the other is oxidizable, where both are colourless or only slightly coloured and one substance is reduced and the other is oxidized on application of a voltage to the display element, with at least one becoming coloured, and after switching off the voltage the two original redox substances are formed again and the display element decolorizes.

4. The electrochromic display element according to claim 3, characterized in that
a) the reducible substance has at least two chemically reversible reduction waves in the cyclic voltammogram and the oxidizable substance correspondingly has at least two chemically reversible oxidation waves, or
b) the reducible substance and the oxidizable substance are covalently bound via a bridge, or
c) the reducible and/or oxidizable substances selected are ones in which the reversible transition between the oxidizable form and the reducible form or vice versa is associated with the breaking or the formation of a σ bond, or
d) the reducible substance and the oxidizable substance are metal salts or metal complexes of metals which exist in at least two oxidation states, or
e) the reducible and/or oxidizable substances are selected from the group consisting of oligomers and polymers which contain at least one of the redox systems mentioned or else pairs of such redox systems as are defined under a) to d), or
f) the reducible and/or oxidizable substances used as mixtures of the substances described in a) to e), provided that these mixtures contain at least one reducible and at least one oxidizable redox system.

5. The electrochromic display element according to claim 1, characterized in that each of said first and second electrodes has a periodic or aperiodic pattern of strips or grids made of metallic conductive material.

6. The electrochromic display element according to claim 5, characterized in that each of said first and second electrodes has a periodic pattern of strips or grids and the lines of the pattern of strips or grids of the two electrodes form an angle with one another.

7. The electrochromic display element according to claim 1, characterized in that the pattern of strips or grid made of metallic conductive material is aperiodic on at least one electrode.

8. The electrochromic display element according to claim 7, characterized in that the periodicity of the pattern of strips or grid on at least one electrode is restricted to a very short distance.

9. display element according to claim 7, characterized in that the arrangement of the aperiodic grid is such that the mean of the distance between two neighboring points of intersection of the grid, taken over all points of intersection of the grid, corresponds to the dot spacing of a periodic dot grid having the same size and the same number of grid points and in that the autocorrelation function of the grid decreases rapidly in all directions for values which are greater than said dot spacing.

10. The electrochromic display element according to claim 1, characterized in that said pattern of strips or grid on the electrode or electrodes is deposited on the transparent, electrically conductive layer.

11. The electrochromic display element according to claim 1, characterized in that the transparent, electrically conductive layer on the electrode is deposited on said pattern of strips or grid.

12. The electrochromic display element according to claim 1, characterized in that said pattern of strips or grid of at least one electrode has a minimum mesh spacing of 3 mm.

13. The electrochromic display element according to claim 1, characterized in that said pattern of strips or grid has a maximum optical density of 0.3.

* * * * *